US012746948B2

(12) United States Patent
Jia et al.

(10) Patent No.: US 12,746,948 B2
(45) Date of Patent: Sep. 29, 2026

(54) METHODS AND SYSTEMS FOR MULTIPLE OBJECT CLASSIFICATION TRACKING IN AUTONOMOUS VEHICLES

(71) Applicant: Torc Robotics, Inc., Blacksburg, VA (US)

(72) Inventors: Bin Jia, Blacksburg, VA (US); Haseeb Chaudhry, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 115 days.

(21) Appl. No.: 18/394,216

(22) Filed: Dec. 22, 2023

(65) Prior Publication Data

US 2025/0206350 A1 Jun. 26, 2025

(51) Int. Cl.
*B60W 60/00* (2020.01)
*G01C 21/28* (2006.01)

(52) U.S. Cl.
CPC ......... *B60W 60/0027* (2020.02); *G01C 21/28* (2013.01)

(58) Field of Classification Search
None
See application file for complete search history.

(56) References Cited

U.S. PATENT DOCUMENTS 5,481,718 A 1/1996 Ryu et al.
5,963,653 A 10/1999 McNary et al.
2016/0055409 A1* 2/2016 Majumdar ............... G06N 3/04 706/20
2016/0350294 A1* 12/2016 Nefedov ............... G06F 16/367
2019/0129432 A1* 5/2019 Russell .................... G06F 18/23
2020/0364508 A1* 11/2020 Gurel ...................... G06N 3/063
2020/0410263 A1* 12/2020 Gao ....................... G01S 17/931
2021/0117948 A1* 4/2021 Voss ...................... G06Q 20/322
2022/0114888 A1* 4/2022 Napanda .............. G08G 1/0112
2022/0250641 A1* 8/2022 Seegmiller ...... B60W 30/18163
2022/0266822 A1* 8/2022 Nardi ................ B60W 30/0956
(Continued)

OTHER PUBLICATIONS

Shen, Q., Ban, X., Liu, R et al. Decay-weighted extreme learning machine for balance and optimization learning. Machine Vision and Applications 28, 743â753 (2017). https://doi.org/10.1007/s00138-017-0828-4 (Year: 2017).*
(Continued)

*Primary Examiner* — Faris S Almatrahi
*Assistant Examiner* — Selena M Jin
(74) *Attorney, Agent, or Firm* — Armstrong Teasdale LLP

(57) ABSTRACT

A method executed by a computing device of an autonomous vehicle includes (i) receiving first sensor data from a network of one or more sensors; (ii) generating a first prediction, based at least in part on the received first sensor data, for an object being associated with a first state with a first confidence value; (iii) receiving second sensor data from the network of one or more sensors after elapsing of time t after receiving the first sensor data; (iv) generating a second prediction, based at least in part on the received second sensor data, for the object being associated with a second state with a second confidence value; and (v) updating a state of the object in a hierarchical representation tree to be the first state or the second state based upon a higher confidence value between the first confidence value and the second confidence value.

17 Claims, 7 Drawing Sheets

(56) References Cited

U.S. PATENT DOCUMENTS

| | | | | |
|---|---|---|---|---|
| 2022/0274625 | A1 | 9/2022 | Garimella et al. | |
| 2022/0326713 | A1 | 10/2022 | Russell et al. | |
| 2023/0030943 | A1 | 2/2023 | Budman et al. | |
| 2023/0054889 | A1* | 2/2023 | Katzir | G08G 1/096775 |
| 2023/0124864 | A1 | 4/2023 | Levihn et al. | |
| 2023/0162028 | A1* | 5/2023 | Shih | G06N 20/20 706/14 |
| 2024/0104121 | A1* | 3/2024 | Kadam | G01C 21/3841 |
| 2024/0190474 | A1* | 6/2024 | Yang | B60W 60/0027 |
| 2025/0005447 | A1* | 1/2025 | Veer | G06N 7/01 |

OTHER PUBLICATIONS

PCT International Search Report and Written Opinion, Application No. PCT/US2024/059945, dated Feb. 24, 2025, 12 pages.

* cited by examiner

METHODS AND SYSTEMS FOR MULTIPLE OBJECT CLASSIFICATION TRACKING IN AUTONOMOUS VEHICLES

TECHNICAL FIELD

The field of the disclosure relates generally to an autonomous vehicle and, more specifically, methods and systems for perception technologies for multiple object classification tracking in an autonomous vehicle.

BACKGROUND OF THE INVENTION

Autonomous vehicles employ three fundamental technologies: perception, localization, and behavior planning and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Behavior planning and control technologies determine how to move through the sensed environment to reach a planned destination. Behavior planning and control technologies process data representing the sensed environment and localization or mapping data to plan maneuvers and routes to reach the planned destination.

Classification information of objects is important for perception in autonomous driving systems. Based on the classification information, planning and control systems can maneuver automated vehicles accordingly. For example, pedestrians and cones may cause different actions when found in the environment of the autonomous vehicle. In general, the class information of a specific object is represented by a flat vector, and the length of the vector is equivalent to the number of classes in the system. With the increasing number of classes of objects (from less than ten to over hundreds of classes), it is difficult to manage and, more specifically, track the class information of objects.

Accordingly, there is a need of improved object classification methods and system that would make the tracking of classification information for multiple objects surrounding an ego vehicle tractable.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a computer-implemented method is disclosed. The method includes (i) receiving, at a computing device of an autonomous vehicle, first sensor data from a network of one or more sensors; (ii) generating a first prediction, based at least in part on the received first sensor data, by the computing device, for an object being associated with a first state with a first confidence value; (iii) receiving, at the computing device of an autonomous vehicle, second sensor data from the network of one or more sensors, where the second sensor data is received after elapsing of time t after receiving the first sensor data; (iv) generating a second prediction, based at least in part on the received second sensor data, by the computing device, for the object being associated with a second state with a second confidence value; and (v) updating, by the computing device, a state of the object in a hierarchical representation tree to be the first state or the second state in accordance with a higher confidence value between the first confidence value and the second confidence value.

In another aspect, an autonomous vehicle including at least one processor and at least one memory storing instructions is disclosed. The instructions, when executed by the at least one processor, cause the at least one processor to perform operations including (i) receiving, at a computing device of an autonomous vehicle, first sensor data from a network of one or more sensors; (ii) generating a first prediction, based at least in part on the received first sensor data, by the computing device, for an object being associated with a first state with a first confidence value; (iii) receiving, at the computing device of an autonomous vehicle, second sensor data from the network of one or more sensors, where the second sensor data is received after elapsing of time t after receiving the first sensor data; (iv) generating a second prediction, based at least in part on the received second sensor data, by the computing device, for the object being associated with a second state with a second confidence value; and (v) updating, by the computing device, a state of the object in a hierarchical representation tree to be the first state or the second state in accordance with a higher confidence value between the first confidence value and the second confidence value.

In yet another aspect, a non-transitory computer-readable medium (CRM) embodying programmed instructions is disclosed. The programmed instructions, when executed by at least one processor of an autonomous vehicle, cause the at least one processor to perform operations including (i) receiving, at a computing device of an autonomous vehicle, first sensor data from a network of one or more sensors; (ii) generating a first prediction, based at least in part on the received first sensor data, by the computing device, for an object being associated with a first state with a first confidence value; (iii) receiving, at the computing device of an autonomous vehicle, second sensor data from the network of one or more sensors, where the second sensor data is received after elapsing of time t after receiving the first sensor data; (iv) generating a second prediction, based at least in part on the received second sensor data, by the computing device, for the object being associated with a second state with a second confidence value; and (v) updating, by the computing device, a state of the object in a hierarchical representation tree to be the first state or the second state in accordance with a higher confidence value between the first confidence value and the second confidence value.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
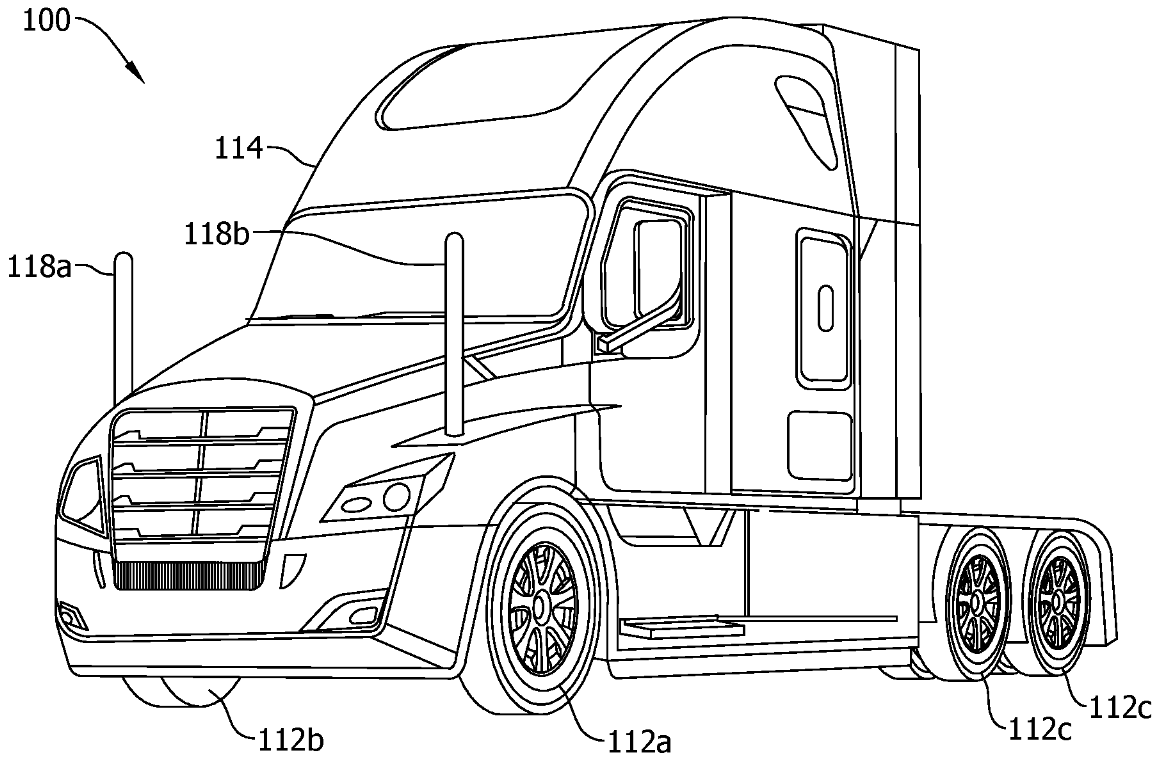
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The Following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA. The semi-autonomous vehicle requires a human driver for operating the semi-autonomous vehicle.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

An ego vehicle: An ego vehicle is an autonomous vehicle that includes a network of one or more sensors to perceive an environment surrounding it and various objects in the environment surrounding it.

As described in the present disclosure, various embodiments are related to make the tracking of classification information for multiple objects surrounding the ego vehicle (or the autonomous vehicle) tractable using evidence-based classification tracking and fusion system or module with a dynamic hypotheses set. The Dempster-Shafer theory is used as an example for the following description. By way of a non-limiting example, the key components of the classification tracking and fusion mechanism may include, but are not limited to, a mechanism to gate and associate class information between tracks and observations, a system or a module to predict the class information over time (a prediction module described below), a system or module to update or fuse the class information from different sources or data structures (an update module described below), and a mechanism to maintain the dynamic hypotheses set over time.

Conventional methods of object classification include machine learning algorithms trained to predict a probability distribution for a predefined set of classes (a vector including all classes). The category with the highest value is finally picked as the class of the object. However, such representations omit the relation between different classes. To overcome this draw-back, the objects may be classified according to a hierarchical classification structure. However, conventional methods of object classification do not support tracking multiple objects classification with underlying hierarchical classification structure. Accordingly, various embodiments, as described in the present disclosure, present tracking and fusion for classification of objects with hierarchical classification representations.

In some embodiments, for the classification tracking and fusion system, the classification may be organized as a tree structure such as, a hierarchical representation, rather than a vector structure. Each node may represent a class. The ancestor and descendant in the tree structure may describe the hierarchical relation between different classes (or nodes).

In some embodiments, an example architecture of the classification tracking may include two components or modules: (i) gating and association; and (ii) tracking. The gating and association component may associate tracks with multiple measurements or observations in a current scan. While the conventional methods of the gating and association component uses the kinematic information and size information of the objects, the gating and association component, as described herein, may also fuse class similarity into distance metrics. In the gating and association component, the distance between different objects can be described by:

$$D = \alpha D_{cls} + \beta D_{others}$$

In the above equation, $D_{cls}$ represents the distance by comparing the class similarity, the $D_{others}$ represents the distance by comparing kinetic information or size information etc., and $\alpha$ and $\beta$ denote weights for $D_{cls}$ and $D_{others}$, respectively.

In some embodiments, $D_{cls}$ may be calculated according to two different methods. By way of a non-limiting example, the first method may be a vector based comparison method. The second method may be a dictionary based comparison method. For the vector based comparison method, the mass values corresponding to all hypotheses for a specific object may be converted to the same representation as the vector given by the object detector. Then the cosine distance or other metrics may be used to evaluate the distance between two vectors. For the dictionary based comparison method, the vector given by the object detector may be converted to the dictionary representation in which the hypothesis and mass value are assigned. Then the distance between two dictionary representation may be calculated by many metrics. For example, the Tessem's distance is given by:

$$D(m_1, m2) = \max_{A \subseteq \theta}\{|BetP_1(A) - BetP_2(A)|\}$$

In the above equation, Θ represents the frame of discernment and may be obtained from the hypothesis set, BetP(A) represents pignistic probability calculated by $$BetP(A) = \Sigma_{B \subseteq \theta} \frac{|A \cap B|}{|B|} \text{mass}(B).$$

Based on the distance metric given above, the conventional association algorithm (such as the global nearest neighbor association, etc.) may be applied to determine the track-observation pairs.

As described herein, the second component is the tracking component that is responsible for the state update of tracks using the associated track-observation pairs. The tracking component, according to embodiments described herein, focuses on the classification tracking, rather than the kinematic information update. For each track, the main components of the classification tracking may be a prediction component (or prediction module) and an update component (or prediction module), which are recursively executed.

In some embodiments, and by way of a non-limiting example, a state of the classification tracking (or a state of the tracker) may be represented or defined as:

```
struct state {
std::unordered_map<std::string, double> massValDict;
double confidence;
std::string className;
char delimiter;
}
```

In the above example representation of the state of the tracker, 'mass ValDict' denotes the dictionary with the key as the hypothesis and the value as the corresponding mass value. The 'confidence' describes the confidence value (between 0 and 1) of the state. The 'class-Name' denotes the class corresponding to the most confident hypothesis described by 'mass ValDict.' The 'delimiter' is used to separate the different classes in the same hypothesis if the hypothesis includes multiple classes. By way of a non-limiting example, other forms of the state may be used. For example, a single 'char' can be used to denote a specific class. Additionally, or alternatively, the delimiter field may not be a required field.

In some embodiments, the original measurement of the object detector may be assumed to be a vector, which is converted to a structure similar to the state structure described above.

```
struct observation{
std::unordered_map<std::string, double> massValDict;
double confidence;
}
```

When the state at time k−1 is available, it may be predicted to time k when the measurement information becomes available. The update step is then performed to update the state of the classification tracking. Thus, the prediction module and the update module are executed recursively when the measurement becomes available.

In some embodiments, the dynamic model may be used to propagate the state from time k−1 to time k. For the classification tracking, the prediction means the confidence of the state decays with the time. Many different models may be used for prediction. For example, the exponentially decaying model may be described by $\gamma_k = \exp(-\delta t)\ \gamma_{k-1}$, where δt represents time difference between time k and k−1, and γ represents the confidence of the state. As described herein, when the (new) state is predicted, the 'mass ValDict' needs to be updated to reflect the uncertainty introduced by the prediction. By way of a non-limiting example, the frame of discernment (FOD) is assumed to be $\{h_1, h_2, \ldots, h_m\}$ with corresponding mass value $\{\alpha_1, \alpha_2 \ldots \alpha_m\}$. After the prediction, the mass value $\alpha_i (i=1, \ldots, m)$ for hypothesis (except the hypothesis $h_n$ in the following equation) $h_i$ may be updated as $\alpha_i \gamma_k$. Additionally, or alternatively, the hypothesis may be updated to consider ambiguity in prediction by $h_n = \cup_{i=1, \ldots, m} h_i$ with the mass value $1-\gamma_k$.

In some embodiments, after the prediction component is executed, the update component may be executed in accordance with the Dempster combination rule used to update or perform fusion. By way of a non-limiting example, a classification of an object may be updated using the following five steps for two different sources classification lists src1 and src2. The source classification list src1 may be a predicted state and the source classification list src2 may be a converted state from the observation.

In some embodiments, the first step of the update or fusion may consolidate necessary classification lists into one classification hypothesis set by (i) traversing the union of classification lists and a hierarchical classification tree to identify ancestor-descendant relationship for each class; (ii) saving descendant classes to the consolidated classification hypothesis set; (iii) merging descendant classes with the same ancestor; and (iv) representing the ancestor by the merged descendant classes (mapping relation denoted as M) and saving the ancestor to the consolidated classification hypothesis set.

In some embodiments, the second step of the update or fusion may assign mass values to the hypothesis in the consolidated hypothesis set for each source by (i) defining hyper-parameter α and β to describe the confidence of src1 and src2, respectively; (ii) assigning mass value directly, if the class is a descendant node, with the value from the input classification vector multiplied by confidence; (iii) assigning mass value to the ancestor node using the mapping relation M and the values from the input classification vector multiplied by confidence; and (iv) the rest of the possibilities may be assigned to the hypothesis unknown or the hypothesis including all other hypotheses.

In some embodiments, the third step of update or fusion may fuse the information of src1 and src2 using Dempster Combination rule (or other rules) based on output in the second step described above. An example combination rule may be represented by:

$$m_{1,2}(\phi) = 0$$

$$m_{1,2}(a) = (m_1 \oplus m_2)(a) = \frac{1}{1-k} \sum_{b \cap c = a \neq \phi} m_1(b) m_2(c)$$

In the equation above, a, b, and c are hypotheses, and K is the conflict measure such that $K = \Sigma_{b \cap c = \emptyset}\ m_1(b)\ m_2(c)$.

In some embodiments, the fourth step of update or fusion may calculate the probability of each class in the consolidated classification set and pick the one with highest probability as output, where belief and plausibility are represented by $\mathrm{Bel}(a)=\Sigma_{b\subseteq a}\ m(a)$ and $\mathrm{Pl}(a)=\Sigma_{b\cap a\neq\emptyset}\ m(a)$, respectively. The probability of classification a may be approximated as $$\frac{Bel(a)+Pl(a)}{2}.$$

Alternatively, the probability of classification a may be calculated according to the pignistic transformation.

In some embodiments, in the fifth step of update or fusion, the trim of hypotheses may be performed according to specific criteria. Trimming of hypotheses may be performed because of the increasing number of hypotheses due to the consolidation in the first step described above. By way of a non-limiting example, the specific criteria may be to check if the number of hypothesis N with corresponding mass value greater than 0 exceeds the threshold. If $N>N_t$, where $N_t$ is a predefined threshold, the hypothesis with small mass value may be removed and the corresponding mass value may be added to the hypothesis including all possible hypotheses (similar to the last step in the second step above that is assigning the rest of the possibilities to the hypothesis unknown or the hypothesis including all other hypotheses). Alternatively, the criteria may be that only the hypothesis with significant mass value may be kept, e.g., $m>m_t$ ($m_t$ is a predefined threshold). Other hypotheses may be removed, and the corresponding mass value may be added to the hypothesis including all possible hypothesis. Finally, the fields in the state may be updated accordingly.

Accordingly, the embodiments described herein may provide solutions for a limitation identified with respect to classification granularity when communicating classification to consumers (planning and control technologies). As described herein, behavior requires a much coarser level of detail, mostly for dynamic actors, while much finer details are required for cases such as static sign classes.

Additionally, or alternatively, the embodiments described herein may provide solutions for limited classification granularity and semantic meaning transparency among different components, lack of consolidated classification taxonomy causing communication problems among different modules, lack or maintenance scheme of a main classification list, or misalignment with system operational design domain (ODD) and testing environment. By way of a non-limiting example, a centralized location for a common, hierarchical representation to reside in an agreed upon format, and independent of parsing methods may be used.

As described herein, in some embodiments, a hierarchical classification tree may be maintained to serve as the common classification representation to communicate class information for discrete object instances. Other classification paradigms for entities such as a roadway type, environmental conditions, operational constraints, and zone types may also be included in the hierarchical classification tree.

By way of a non-limiting example, the hierarchical classification tree may be encoded in a JavaScript Object Notation (JSON) file which allows for a format supported by most programming languages that may be used to interface with the hierarchical classification tree. The file corresponding to the hierarchical classification tree (or the classification set) may be stored in a repository called 'classifications' to keep it independent from any evolving parsing code. Over time, the classification set, and the system ODD classification requirements may be converged for traceability using, for example, Cameo/Jama tooling.

By way of a non-limiting example, the hierarchical classification tree may be created from an amalgamation of the currently existing individual classification lists across various autonomy components. Additionally, or alternatively, a uniform taxonomy and hierarchy scheme may be maintained using a rule set for modifying or adding classes.

In some embodiments, the classification representation may also have metadata as tags, and as part of the hierarchical representation tree encoded in a JSON file, additional fields indicating supported metadata for a class (or node) may be provided. By way of a non-limiting example, a sign class may include numeric or textual data to convey sign content, while a vehicle class may include light state enumerations. Metadata tags of a parent class (or node) apply to all child classes (or nodes).

In some embodiments, and by way of a non-limiting example, the hierarchical classification representation in the JSON file may be in accordance with the Apache AVRO JSON specification. A basic entry example to capture information relating to a single label, or node, may be as shown below.

```
{
  "name": "your_label_name_here",
  "arbitrary_data":
    {
      "type": "insert_type_name_here",
      "value": <your_data_here>,
    }
  "children": [ ]
}
```

In the above basic entry example, each node or single label may be enclosed in curly brackets { }. The name and children fields may be reserved to capture each node's name and relationship to other nodes. Each node may include custom tags to capture additional metadata information that may be communicated or required to be communicated as part of the node. By way of a non-limiting example, a "shape_prior" tag may be used to capture and communicate size information for an object of certain classes. Additionally, or alternatively, primitive and complex data types, as specified in the Apache AVRO JSON specification, may also be used for metadata representation.

The children field may be an optional field for terminal nodes. The children field may be populated with additional nodes, and those nodes' children field may be populated with their children nodes, and so on. A child node may inherit tags from its parent node. In some examples, when the child node and the parent node each has the same tag, then a value of the parent node tag may be overridden. A class SemiTrailer has a 'shape_prior' tag and its child node 'VehicleCarrier' subclass also has a 'shape_prior' tag, a value of 'shape_prior' tag for the SemiTrailer class may be overridden by a value of the 'shape_prior' tag of the VehicleCarrier' subclass.

Accordingly, various embodiments described herein provides runtime update of objects classifications as perceived through perception technologies for behavior or planning technologies. Additionally, or alternatively, various embodiments described herein may improve speed of perception technologies using an improved algorithms or equations described herein. Various embodiments are discussed in more detail below with respect to FIGS. 1-9.

FIG. 1 illustrates an autonomous vehicle 100 that may further be conventionally connected to a single or tandem trailer to transport the trailers (not shown) to a desired location. The vehicle 100 includes a cabin 114 and can be supported by, and steered in, the required direction by front wheels 112*a*, 112*b*, and rear wheels 112*c* that are partially shown in FIG. 1. Wheels 112*a*, 112*b* are positioned by a steering system that includes a steering wheel and a steering column (not shown in FIG. 1). The steering wheel and the steering column may be located in the interior of cabin 114.

A master control unit (MCU) (not shown in FIG. 1) of the autonomous vehicle 100 may periodically transmit telematics data via one or more antennas 118 to a mission control. As described herein, the telematics data may include, but is not limited to, global positioning system (GPS) data of the autonomous vehicle 100, speed of the autonomous vehicle 100, vehicle maintenance data corresponding to the autonomous vehicle 100, or sensor data related to monitoring of various electrical or mechanical components or modules of the autonomous vehicle 100. Additionally, or alternatively, the mission control may request the autonomous vehicle 100 to send the telematics data, or the autonomous vehicle 100 may send the telematics data to the mission control when analysis of the telematics data suggest an electrical component or module, or a mechanical component or module of the vehicle 100 is malfunctioning. The autonomous vehicle 100 may also send the telematics data to mission control when the autonomous vehicle 100 is stalled on a roadway. The MCU may also receive data from a sensor network including one or more sensors such as cameras, microphones, radio detection and ranging (RADAR) devices, light detection and ranging (LiDAR) sensors, and acoustic sensors, etc. The data received from the sensor network may be used for identifying or perceiving various objects in the environment of the autonomous vehicle 100 by the MCU.

Figure 2:
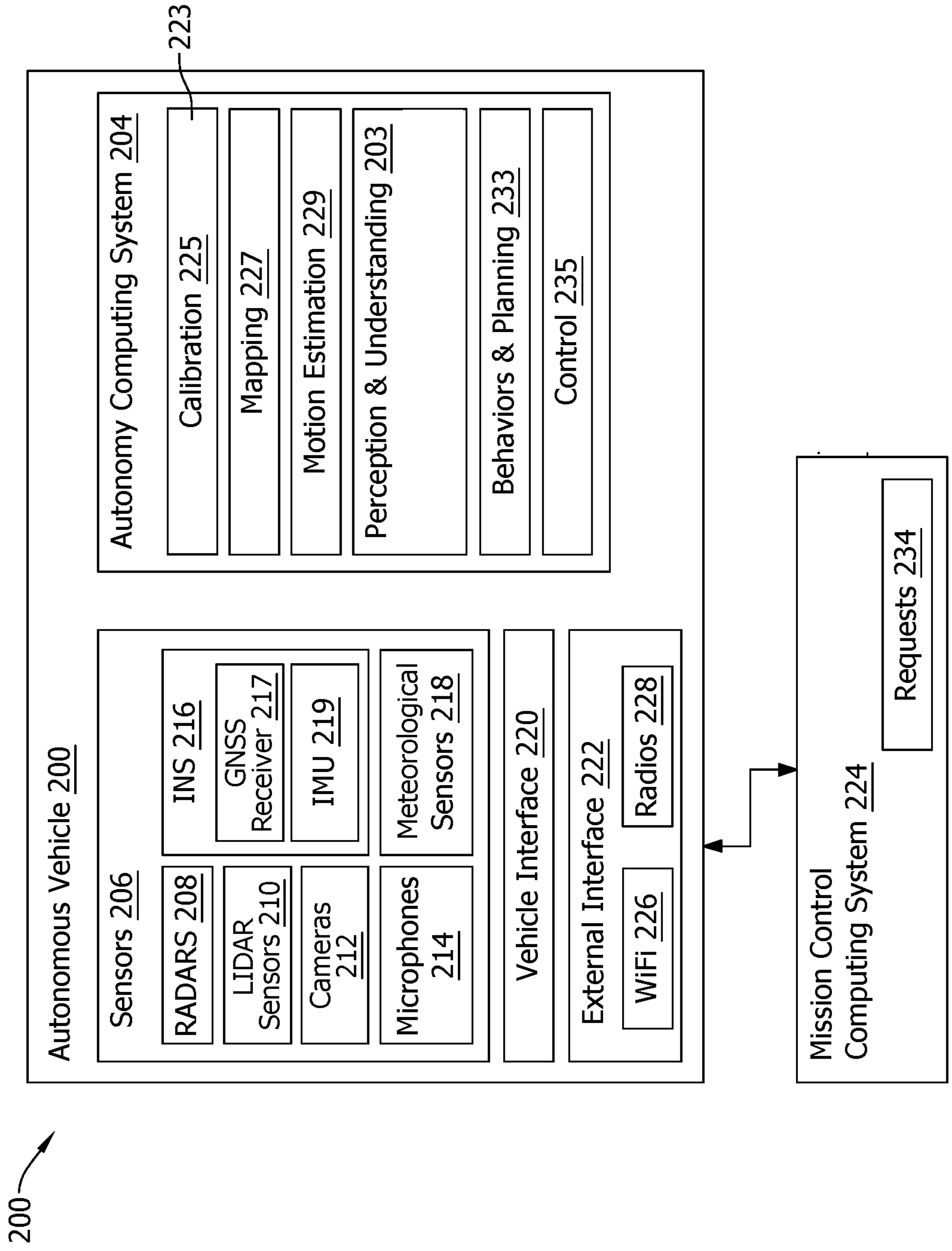
FIG. 2 is a block diagram of an example autonomous driving system.

FIG. 2 is a block diagram of an autonomous driving system 200, including an autonomous vehicle 100 (shown in FIG. 1) that is communicatively coupled with a mission control computing system 224.

In some embodiments, the mission control computing system 224 may transmit control commands or data to the autonomous vehicle 100, such as navigation commands, and travel trajectories to the autonomous vehicle 100, and may receive telematics data from the autonomous vehicle 100.

In some embodiments, the autonomous vehicle 100 may further include sensors 206. Sensors 206 may include radio detection and ranging (RADAR) devices 208, light detection and ranging (LiDAR) sensors 210, cameras 212, and acoustic sensors 214. The sensors 206 may further include an inertial navigation system (INS) 216 configured to determine states such as the location, orientation, and velocity of the autonomous vehicle 100. The INS 216 may include at least one global navigation satellite system (GNSS) receiver 217 configured to provide positioning, navigation, and timing using satellites. The INS 216 may also include an inertial measurement unit (IMU) 219 configured to measure motion properties such as the angular velocity, linear acceleration, or orientation of the autonomous vehicle 100. The sensors 206 may further include meteorological sensors 218. Meteorological sensors 218 may include a temperature sensor, a humidity sensor, an anemometer, pitot tubes, a barometer, a precipitation sensor, or a combination thereof. The meteorological sensors 218 are used to acquire meteorological data, such as the humidity, atmospheric pressure, wind, or precipitation, of the ambient environment of autonomous vehicle 100.

The autonomous vehicle 100 may further include a vehicle interface 220, which interfaces with an engine control unit (ECU) (not shown) or a MCU (not shown) of autonomous vehicle 100 to control the operation of the autonomous vehicle 100 such as acceleration and steering. The vehicle interface 220 may be a controller area network (CAN) bus interface.

The autonomous vehicle 100 may further include external interface 222 configured to communicate with external devices or systems such as another vehicle or mission control computing system 224. The External interface 222 may include Wi-Fi 226, other radios 228 such as Bluetooth, or other suitable wired or wireless transceivers such as cellular communication devices. Data detected by the sensors 206 may be transmitted to the mission control computing system 224 via the external interface 222, or to the ECU or MCU via the vehicle interface 220.

The autonomous vehicle 100 may further include an autonomy computing system 204. The autonomy computing system 204 may control driving of the autonomous vehicle 100 through the vehicle interface 220. The autonomy computing system 204 may operate the autonomous vehicle 100 to drive the autonomous vehicle from one location to another.

In some embodiments, the autonomy computing system 204 may include modules 223 for performing various functions. Modules 223 may include a calibration module 225, a mapping module 227, a motion estimation module 229, perception and understanding module 203, behaviors and planning module 233, and a control module 235. Perception and understanding module 203 may be configured to analyze data from sensors 206 to identify an object. Modules 223 and submodules may be implemented in dedicated hardware such as, for example, an application specific integrated circuit (ASIC), field programmable gate array (FPGA), or microprocessor, or implemented as executable software modules, or firmware, written to memory and executed on one or more processors onboard the autonomous vehicle 100.

Various embodiments described herein for perceiving or identifying objects in the environment of the autonomous vehicle 100 may be implemented using the perception and understanding module 203. In some embodiments, based on the data collected from the sensors 206, the autonomy computing system 204 and, more specifically, perception and understanding module 203 senses the environment surrounding autonomous vehicle 100 by gathering and interpreting sensor data. Perception and understanding module 203 interprets the sensed environment by identifying and classifying objects or groups of objects in the environment, and updating the hierarchical representation tree, as described herein. For example, perception and understanding module 203 in combination with various sensors 206 (e.g., LiDAR, camera, radar, etc.) of the autonomous vehicle 100 may identify one or more objects (e.g., pedestrians, vehicles, debris, etc.) and features of a roadway (e.g., lane lines) around autonomous vehicle 100, and classify the objects in the road distinctly.

In some embodiments, a method of controlling an autonomous vehicle, such as autonomous vehicle 100, includes collecting perception data representing a perceived environment of autonomous vehicle 100 using perception and understanding module 203, comparing the perception data collected with digital map data, and modifying operation of the vehicle based on an amount of difference between the perception data and the digital map data. Perception data may include sensor data from sensors 206, such as cameras 212, LiDAR sensors 210, GNSS receiver 217, or IMU 219.

Mapping module 227 receives perception data that can be compared to one or more digital maps stored in mapping module 227 to determine where autonomous vehicle 100 is in the world or where autonomous vehicle 100 is on the digital map(s). In particular, mapping module 227 may receive perception data from perception and understanding module 203 or from the various sensors sensing the environment surrounding autonomous vehicle 100 and may correlate features of the sensed environment with details (e.g., digital representations of the features of the sensed environment) on the one or more digital maps. The digital map may have various levels of detail and can be, for example, a raster map, or a vector map. The digital maps may be stored locally on autonomous vehicle 100 or stored and accessed remotely. In at least one embodiment, autonomous vehicle 100 deploys with sufficient stored information in one or more digital map files to complete a mission without connection to an external network during the mission.

In the example embodiment, behaviors and planning module 233 and control module 235 plan and implement one or more behavior-based trajectories to operate the autonomous vehicle 100 similar to a human driver-based operation. The behaviors and planning module 233 and control module 235 use inputs from the perception and understanding module 203 or mapping module 227 to generate trajectories or other planned behaviors. For example, behavior and planning module 233 may generate potential trajectories or actions and select one or more of the trajectories to follow or enact as the vehicle travels along the road. The trajectories may be generated based on proper (i.e., legal, customary, or safe) interaction with other static and dynamic objects in the environment. Behaviors and planning module 233 may generate local objectives (e.g., following rules or restrictions) such as, for example, lane changes, stopping at stop signs, etc. Additionally, behavior and planning module 233 may be communicatively coupled to, include, or otherwise interact with motion planners, which may generate paths or actions to achieve local objectives. Local objectives may include, for example, reaching a goal location while avoiding obstacle collisions.

In the example embodiment, based on the data collected from sensors 206, autonomy computing system 204 is configured to perform calibration, analysis, and planning, and control the operation and performance of autonomous vehicle 100. For example, autonomy computing system 204 is configured to estimate the motion of autonomous vehicle 100, calibrate the speed and moving direction of autonomous vehicle 100, and provide a map of surroundings of autonomous vehicle 100 or the travel routes of autonomous vehicle 100. Autonomy computing system 204 is configured to analyze the behaviors of autonomous vehicle 100 and generate and adjust the trajectory plans for the autonomous vehicle 100 based on the behaviors computed by behaviors and planning module 233.

Figure 3:
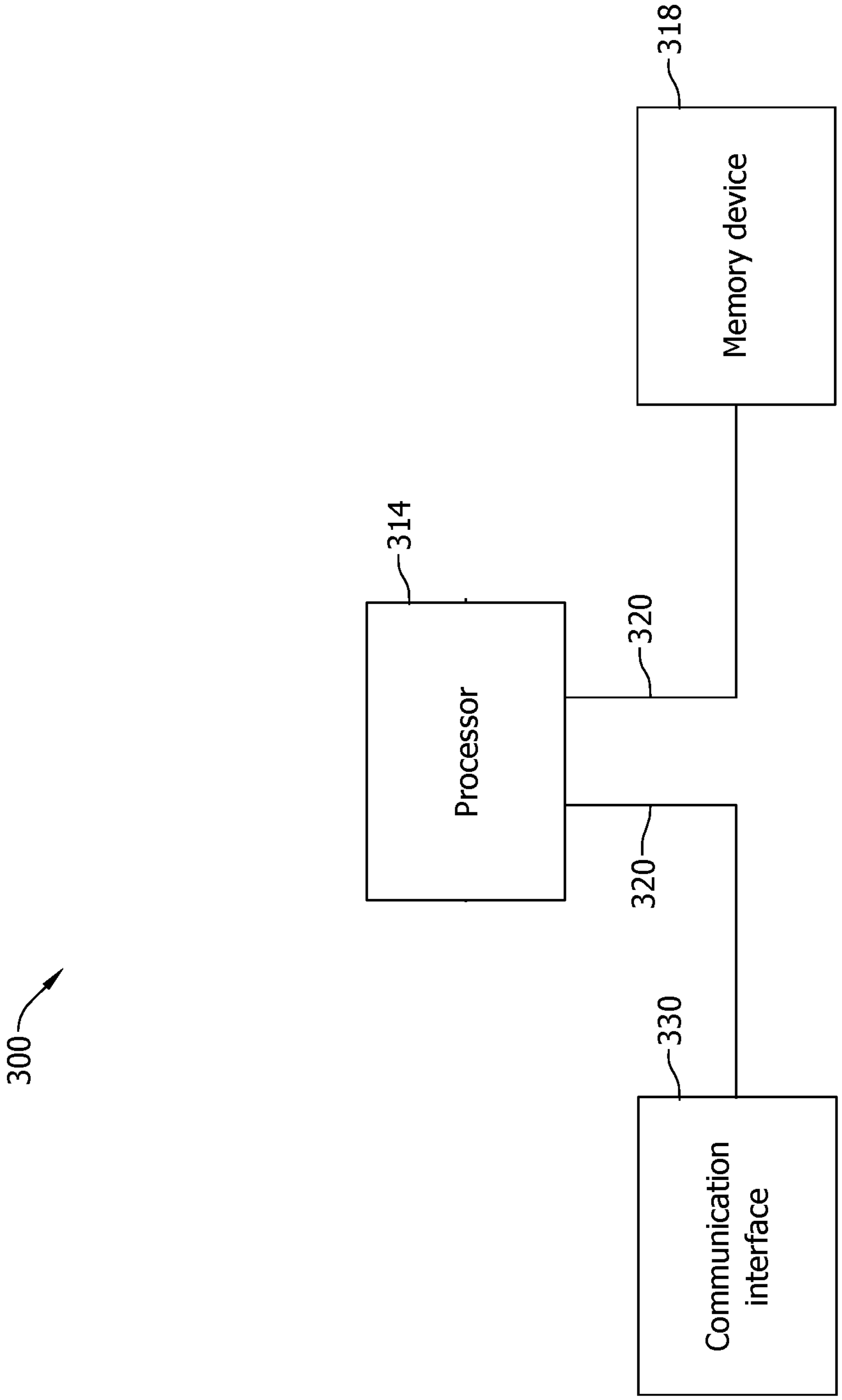
FIG. 3 is a block diagram of an example computing device.

Method operations described herein may be implemented on autonomy computing system 204, or more specifically on perception and understanding module 203. Additionally, or alternatively, the method operations may be performed on an ECU or MCU. Autonomy computing system 204 (or perception and understanding module 203) described herein may be any suitable computing device 300 and software implemented therein. FIG. 3 is a block diagram of an example computing device 300.

Computing device 300 includes a processor 314 and a memory device 318. The processor 314 is coupled to the memory device 318 via a system bus 320. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, the memory device 318 includes one or more devices that enable information, such as executable instructions or other data, to be stored and retrieved. Moreover, the memory device 318 includes one or more computer readable media, such as, without limitation, dynamic random access memory (DRAM), static random access memory (SRAM), a solid state disk, or a hard disk. In the example embodiment, the memory device 318 stores, without limitation, application source code, application object code, configuration data, additional input events, application states, assertion statements, validation results, a hierarchical representation tree including various nodes and sub-nodes, or any other type of data. The computing device 300, in the example embodiment, may also include a communication interface 330 that is coupled to the processor 314 via system bus 320. Moreover, the communication interface 330 is communicatively coupled to data acquisition devices.

In the example embodiment, processor 314 may be programmed by encoding an operation using one or more executable instructions and providing the executable instructions in the memory device 318. In the example embodiment, the processor 314 is programmed to select a plurality of measurements that are received from data acquisition devices.

In operation, a computer executes computer-executable instructions embodied in one or more computer-executable components stored on one or more computer-readable media to implement aspects of the invention described or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 4:
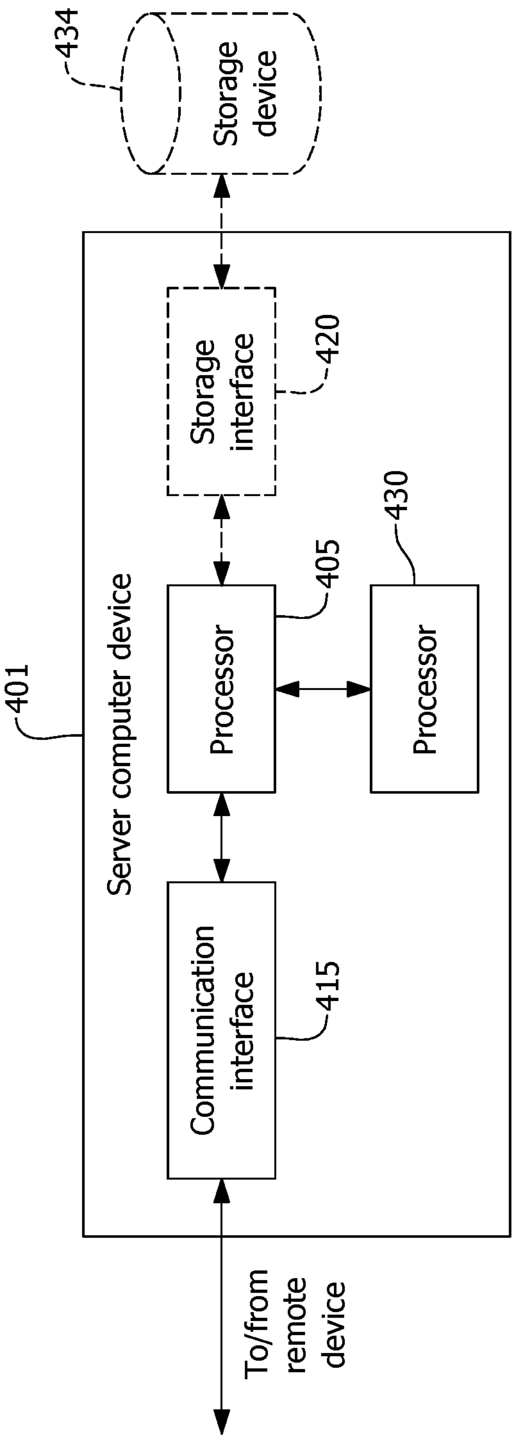
FIG. 4 is a block diagram of an example server computing device.

FIG. 4 illustrates an example configuration of a server computer device 401 such as mission control computing system 224. The server computer device 401 also includes a processor 405 for executing instructions. Instructions may be stored in a memory area 430, for example. Processor 405 may include one or more processing units (e.g., in a multi-core configuration). By way of a non-limiting example, in some embodiments, the server computing device 401 may receive sensor data for object classification from the autonomous vehicle 100, and the processor 405 may generate a hierarchical representation tree including various nodes and sub-nodes based on the sensor data according to the embodiments described herein.

Processor 405 is operatively coupled to a communication interface 415 such that server computer device 401 is capable of communicating with a remote device or another server computer device 401. For example, communication interface 415 may receive data from autonomy computing system 204 or sensors 206, via the Internet or wireless communication.

Processor 405 may also be operatively coupled to a storage device 434. Storage device 434 is any computer-operated hardware suitable for storing and/or retrieving data. In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include multiple storage units such as hard disks and/or solid state disks in a redundant array of independent disks (RAID) configuration. storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 5:
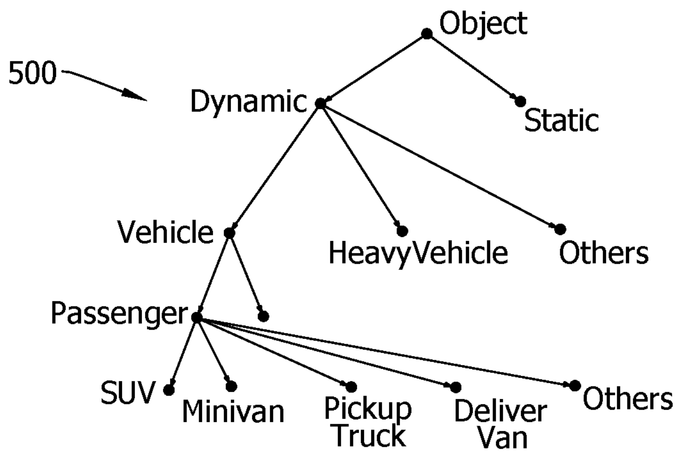
FIG. 5 is an example hierarchical classification tree.

FIG. 5 illustrates an example hierarchical classification tree 500 in which an object (a root node or a root class) may be classified either as a dynamic object or a static object. Accordingly, nodes corresponding to the dynamic object and the static object may be sub-nodes or sub-classes of the root node or the root class. The dynamic object may be further classified into a vehicle sub-class, a heavy-vehicle sub-class, and others sub-class such that vehicle sub-class may be identified differently from the heavy-vehicle sub-class and others sub-class for behavior and planning control. The vehicle sub-class may further have one or more sub-classes, for example, a passenger vehicle sub-class, which may have a plurality of sub-classes including, but not limited to, a sports-utility-vehicle (SUV) sub-class, a MiniVan sub-class, a Pickup-Truck sub-class, a Delivery-Van sub-class, and others sub-class.

Figure 6:
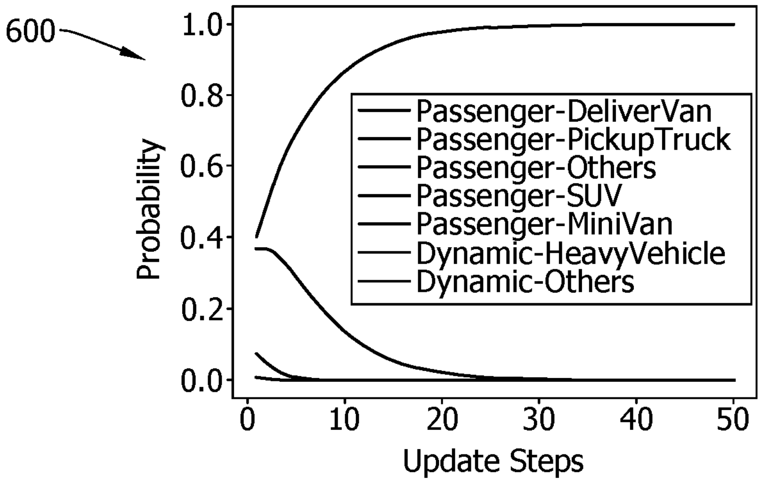
FIG. 6 and FIG. 7 are charts illustrating dynamic updating of an object's classification.
Figure 7:
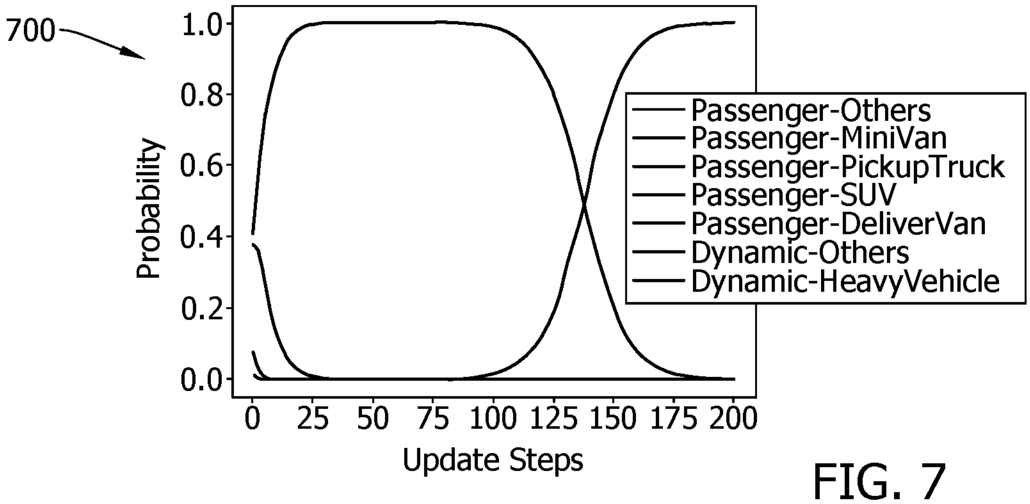

FIG. 6 and FIG. 7 illustrate how classification of an object may be dynamically updated based on probability determined for the object to have properties corresponding to a particular sub-class as sensor data become available over time (or steps). For example, an object may have an initial classification src1 with confidence 0.8 and may be described as {Vehicle: 0.3, PickupTruck: 0.4, SUV: 03, Passenger—Others: 0.2}, and the same object may be classified by an object detector (OD) src2 with confidence 0.9 as {SUV: 0.39, PickupTruck: 0.3, MiniVan: 0.1, Delivery Van: 0.1, Passenger—Others: 0.1, Dynamic—Others: 0.01} for the hierarchical classification tree 500. An initial classification of the object may be taken in accordance with the src1, and when data from src2 is received, as shown in the chart 600, for 50 times, the probability for each class may be updated, as shown in the chart 600. As shown in the chart 600, the sub-class SUV has higher mass value and the object may be classified as an SUV after 50 updates, but as shown in a chart 700 of FIG. 7, after receiving data from src2 for about 150 times, based on the updated probability for each class, the object may be classified as a Pickup truck and thus the classification may be updated from the SUV to the Pickup truck.

Figure 8:
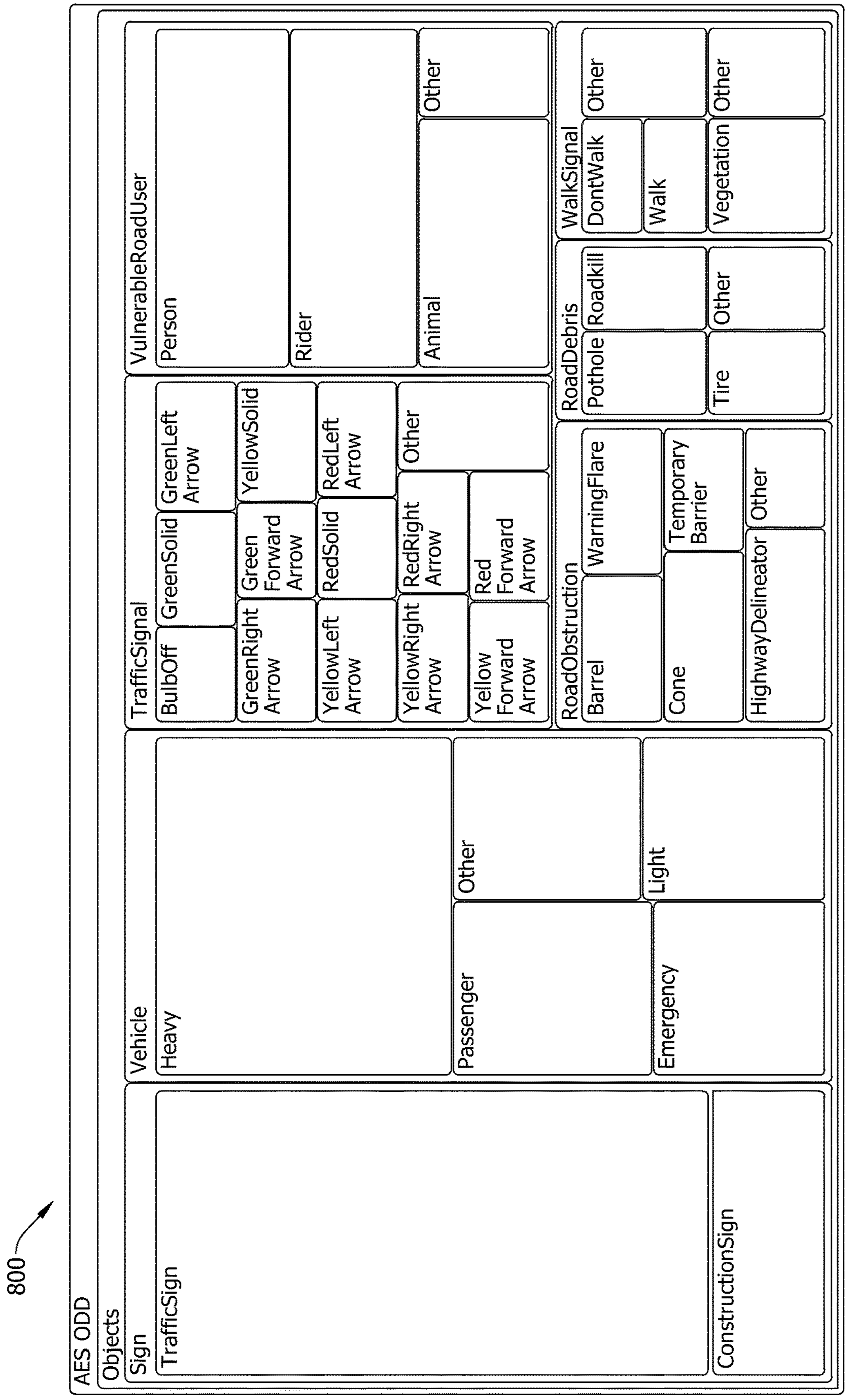
FIG. 8 illustrates another form of an example hierarchical classification tree.

FIG. 8 illustrates another form of an example hierarchical classification tree 800. As shown in the hierarchical classification tree 800, various nodes or classes and their subclasses are shown. For example, a Sign node and a TrafficSign node may have a parent-child relationship. Similarly, the Sign node and the ConstructionSign node may have a parent-child relationship. The ConstructionSign node and the TrafficSign node may be at the same level in a parent-child relationship with the Sign node. In FIG. 8, parent-child relationship for parent nodes Vehicle, TrafficSignal, VulnerableRoadUser, RoadObstruction, RoadDebris, WalkSignal, etc., is also shown.

Figure 9:
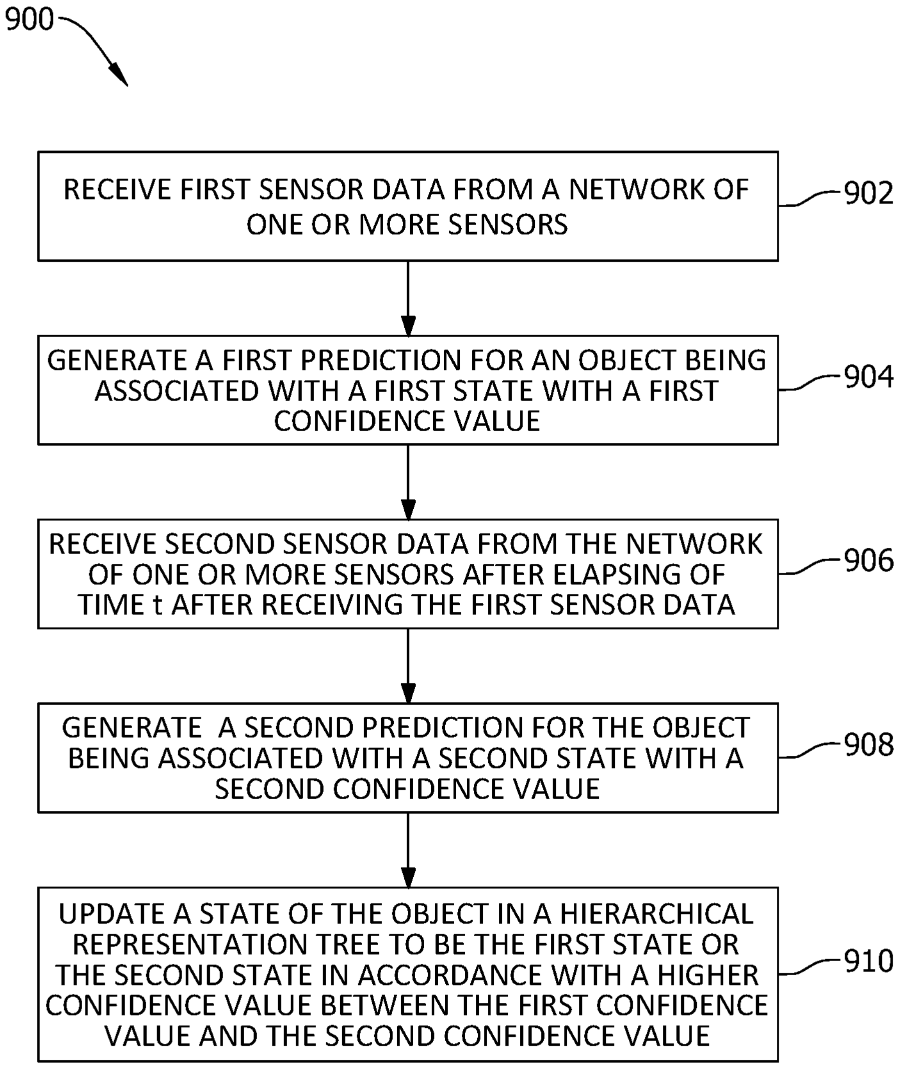
FIG. 9 is a flow-chart of an example method of dynamic updating of an object's classification.

FIG. 9 is a flow-chart 900 of example method operations for dynamic updating of an object's classification. The method operations may include receiving 902, at a computing device of an autonomous vehicle, first sensor data from a network of one or more sensors. By way of a non-limiting example, the one or more sensors may include, but are not limited to, cameras, microphones, RADAR devices, LiDAR sensors, and acoustic sensors, etc. The method operations may further include generating a first prediction 904, by the computing device, for an object being associated with a first state with a first confidence value. The first prediction may be made based at least in part on probability determined in accordance with the received first sensor data. The first sensor data may include data corresponding to properties, such as kinetic information of the object and/or size information of the object, corresponding to a particular sub-class. The first prediction is made based at least in part on a distance metric. As described herein, the distance metric identifies class similarity between two different objects.

As the autonomous vehicle is driving or moving on the road, second sensor data from the network of one or more sensors may be received 906 at the computing device of an autonomous vehicle. The second sensor data may be received after elapsing of time t after receiving the first sensor data. Based at least in part on the received second sensor data, the computing device of the autonomous vehicle may generate a second prediction 908 for the object to associate with a second state with a second confidence value. The second prediction may be generated based at least in part on the received second sensor data and based at least in part on the probability determined in accordance with the received second sensor data for the object to have properties, such as such as kinetic information of the object and/or size information of the object, corresponding to another particular sub-class. As described herein, the second confidence value may be determined based upon an exponentially decaying model described by $\gamma_k=\exp(-\delta t)\ \gamma_{k-1}$, where $\delta t$ represents time difference between time k and k−1 corresponding to the receiving second sensor data and first sensor data, respectively, and $\gamma_k$ and $\gamma_{k-1}$ represent the second confidence value and the first confidence value, respectively.

Similar to the first prediction, the second prediction may be made based at least in part on the received second sensor data and the distance metric. The second sensor data may include data corresponding to kinetic information of the object and/or size information of the object. As described herein, the class similarity between two different objects is represented by $D=\alpha D_{cls}+\beta D_{others}$, where $D_{cls}$ represents the distance by comparing the class similarity between the two different objects, the $D_{others}$ represents the distance by comparing kinetic information or size information of the two different objects, and $\alpha$ and $\beta$ denote weights for $D_{cls}$ and $D_{others}$, respectively. Further, $D_{cls}$ may be calculated according to a vector based comparison method or a dictionary based comparison method.

The method operations may include updating 910, by the computing device, a state of the object in a hierarchical representation tree. The state of the object in the hierarchical representation tree may be updated to be the first state or the second state in accordance with a higher confidence value between the first confidence value and the second confidence value. In some embodiments, and by way of a non-limiting example, updating the state of the object may also include consolidating a plurality of classification lists into the hierarchical representation tree, which may be encoded using JSON.

Accordingly, the embodiments described herein may provide solutions for a limitation identified with respect to classification granularity when communicating classification to consumers (planning and control technologies). As described herein, behavior may require a much coarser level of detail, mostly for dynamic actors, while much finer details are required for cases such as static sign classes.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A computer-implemented method, comprising:

receiving, at a computing device of an autonomous vehicle, first sensor data from a network of one or more sensors;

generating a first prediction, based at least in part on the received first sensor data and based at least in part on probability determined in accordance with the received first sensor data for an object to have properties corresponding to a particular sub-class, by the computing device, for the object being associated with a first state with a first confidence value;

receiving, at the computing device of an autonomous vehicle, second sensor data from the network of one or more sensors, the second sensor data received after elapsing of time t after receiving the first sensor data;

generating a second prediction, based at least in part on the received second sensor data and based at least in part on the probability determined in accordance with the received second sensor data for the object to have properties corresponding to another particular sub-class, by the computing device, for the object being associated with a second state with a second confidence value, generating the second prediction further comprising:

determining the second confidence value based on an exponentially decaying model described by $\gamma_k=\exp(-\delta t)\gamma_{k-1}$, where δt represents time difference between time k and k−1 corresponding to receiving the second sensor data and receiving the first sensor data, respectively, and γ and γk−1 represent the second confidence value and the first confidence value, respectively;

updating, by the computing device, a state of the object in a hierarchical representation tree to be the first state or the second state in accordance with a higher confidence value between the first confidence value and the second confidence value; and controlling operation of the autonomous vehicle based on the updated state of the object.

2. The computer-implemented method of claim 1, wherein generating the first prediction or generating the second prediction comprises generating the first prediction or generating the second prediction based upon kinetic information of the object, size information of the object, and a distance metric, wherein the distance metric identifies class similarity between two different objects.

3. The computer-implemented method of claim 2, wherein the class similarity between two different objects is represented by $D=\alpha D_{cls}+\beta D_{others}$, where $D_{cls}$ represents the distance by comparing the class similarity between the two different objects, the $D_{others}$ represents the distance by comparing kinetic information or size information of the two different objects, and α and β denote weights for $D_{cls}$ and $D_{others}$, respectively.

4. The computer-implemented method of claim 3, wherein $D_{cls}$ is calculated according to a vector based comparison method or a dictionary based comparison method.

5. The computer-implemented method of claim 1, wherein the updating further comprises consolidating a plurality of classification lists into the hierarchical representation tree.

6. The computer-implemented method of claim 1, wherein the hierarchical representation tree is encoded using a JavaScript Object Notation (JSON).

7. An autonomous vehicle, comprising:

at least one processor; and at least one memory storing instructions, which, when executed by the at least one processor, cause the at least one processor to perform operations comprising:

receiving, at a computing device of an autonomous vehicle, first sensor data from a network of one or more sensors;

generating a first prediction, based at least in part on the received first sensor data and based at least in part on probability determined in accordance with the received first sensor data for an object to have properties corresponding to a particular sub-class, by the computing device, for an object being associated with a first state with a first confidence value;

receiving, at the computing device of an autonomous vehicle, second sensor data from the network of one or more sensors, the second sensor data received after elapsing of time t after receiving the first sensor data;

generating a second prediction, based at least in part on the received second sensor data and based at least in part on the probability determined in accordance with the received second sensor data for the object to have properties corresponding to another particular sub-class, by the computing device, for the object being associated with a second state with a second confidence value, generating the second prediction further comprising:

determining the second confidence value based on an exponentially decaying model described by $\gamma_k=\exp(-\delta t)\gamma_{k-1}$, where δt represents time difference between time k and k−1 corresponding to receiving the second sensor data and receiving the first sensor data, respectively, and $\gamma_k$ and $\gamma_{k-1}$ represent the second confidence value and the first confidence value, respectively;

updating, by the computing device, a state of the object in a hierarchical representation tree to be the first state or the second state in accordance with a higher confidence value between the first confidence value and the second confidence value; and controlling operation of the autonomous vehicle based on the updated state of the object.

8. The autonomous vehicle of claim 7, wherein generating the first prediction or generating the second prediction comprises generating the first prediction or generating the second prediction based upon kinetic information of the object, size information of the object, and a distance metric, wherein the distance metric identifies class similarity between two different objects.

9. The autonomous vehicle of claim 8, wherein the class similarity between two different objects is represented by $D=\alpha D_{cls}+\beta D_{others}$, where $D_{cls}$ represents the distance by comparing the class similarity between the two different objects, the $D_{others}$ represents the distance by comparing kinetic information or size information of the two different objects, and α and β denote weights for $D_{cls}$ and $D_{others}$, respectively.

10. The autonomous vehicle of claim 9, wherein $D_{cls}$ is calculated according to a vector based comparison method or a dictionary based comparison method.

11. The autonomous vehicle of claim 7, wherein the updating further comprises consolidating a plurality of classification lists into the hierarchical representation tree.

12. The autonomous vehicle of claim 7, wherein the hierarchical representation tree is encoded using a JavaScript Object Notation (JSON).

13. A non-transitory computer-readable medium (CRM) embodying programmed instructions which, when executed by at least one processor of an autonomous vehicle, cause the at least one processor to perform operations comprising:

receiving, at a computing device of an autonomous vehicle, first sensor data from a network of one or more sensors;

generating a first prediction, based at least in part on the received first sensor data and based at least in part on probability determined in accordance with the received first sensor data for an object to have properties corresponding to a particular sub-class, by the computing device, for an object being associated with a first state with a first confidence value;

receiving, at the computing device of an autonomous vehicle, second sensor data from the network of one or more sensors, the second sensor data received after elapsing of time t after receiving the first sensor data;

generating a second prediction, based at least in part on the received second sensor data and based at least in part on the probability determined in accordance with the received second sensor data for the object to have properties corresponding to another particular sub-class, by the computing device, for the object being associated with a second state with a second confidence value, generating the second prediction further comprising:

determining the second confidence value based on an exponentially decaying model described by $\gamma_k = \exp(-\delta t)\gamma_{k-1}$, where $\delta t$ represents time difference between time k and k−1 corresponding to receiving the second sensor data and receiving the first sensor data, respectively, and $\gamma_k$ and $\gamma_{k-1}$ represent the second confidence value and the first confidence value, respectively;

updating, by the computing device, a state of the object in a hierarchical representation tree to be the first state or the second state in accordance with a higher confidence value between the first confidence value and the second confidence value; and controlling operation of the autonomous vehicle based on the updated state of the object.

14. The non-transitory CRM of claim 13, wherein generating the first prediction or generating the second prediction comprises generating the first prediction or generating the second prediction based upon kinetic information of the object, size information of the object, and a distance metric, wherein the distance metric identifies class similarity between two different objects.

15. The non-transitory CRM of claim 14, wherein the class similarity between two different objects is represented by $D=\alpha D_{cls}+\beta D_{others}$, where $D_{cls}$ represents the distance by comparing the class similarity between the two different objects, the $D_{others}$ represents the distance by comparing kinetic information or size information of the two different objects, and $\alpha$ and $\beta$ denote weights for $D_{cls}$ and $D_{others}$, respectively.

16. The non-transitory CRM of claim 15, wherein $D_{cls}$ is calculated according to a vector based comparison method or a dictionary based comparison method.

17. The non-transitory CRM of claim 13, wherein the updating further comprises consolidating a plurality of classification lists into the hierarchical representation tree.

* * * * *